United States Patent [19]

Neumann

[11] Patent Number: 5,794,860
[45] Date of Patent: Aug. 18, 1998

[54] GAS INJECTOR FOR GAS FUELED INTERNAL COMBUSTION ENGINE

[75] Inventor: Barry Richard Neumann, Hillarys WA, Australia

[73] Assignee: Transcom Gas Technologies PTY, Ltd., Western Australia, Australia

[21] Appl. No.: 448,536

[22] PCT Filed: Dec. 21, 1993

[86] PCT No.: PCT/AU93/00672

§ 371 Date: Oct. 11, 1995

§ 102(e) Date: Oct. 11, 1995

[87] PCT Pub. No.: WO94/15092

PCT Pub. Date: Jul. 7, 1994

[30] Foreign Application Priority Data

Dec. 21, 1992 [AU] Australia ................ PL6494
Dec. 21, 1992 [AU] Australia ................ PL6495

[51] Int. Cl.$^6$ .......................... F02M 51/06; F16K 31/05
[52] U.S. Cl. .......................... 239/585.3; 251/129.21
[58] Field of Search .................... 239/585.3, 585.4; 251/129.15, 129.21

[56] References Cited

U.S. PATENT DOCUMENTS

| | | | |
|---|---|---|---|
| 3,241,768 | 3/1966 | Croft | 239/585.3 X |
| 4,116,389 | 9/1978 | Furtah et al. | 239/545.3 X |
| 4,477,027 | 10/1984 | Knapp et al. | 251/129.21 X |
| 5,188,336 | 2/1993 | Graner et al. | 239/585.3 X |

FOREIGN PATENT DOCUMENTS

| | | | |
|---|---|---|---|
| 571003 | 11/1993 | European Pat. Off. | 239/585.3 |
| 58-62359 | 4/1983 | Japan | 239/585.3 |

OTHER PUBLICATIONS

TK Garrett, "Automotive Fuels and Fuel Systems" vol. 1, published 1991, by Pentech Press (figure 11:36 and associated text, p. 259).

*Primary Examiner*—Lesley D. Morris
*Attorney, Agent, or Firm*—Caesar, Rivise, Bernstein, Cohen & Pokotilow, Ltd.

[57] ABSTRACT

A gas injector for a gas fueled internal combustion engine having a valve member that is movable between a first or closed position, in which a flow of gas through the injector is prevented, and a second or open position in which a flow of gas is permitted through the injector. A solenoid actuator moves the valve member from the first to the second position responsive to an electrical control signal which is modulated to precisely control the quantity of gas to be delivered by the gas injector to the internal combustion engine. The valve member includes a hollow valve stem having a first opening at one end and a second opening in the form of three radial apertures at the other end to allow a flow of gas through the valve member in use. The valve stem is provided with an annular flange of magnetic material at one end, which faces the end face of the solenoid actuator and forms the armature of the magnetic circuit formed by the solenoid actuator. An outer casing of the injector is manufactured of magnetic material and includes a wall immediately adjacent a coil so that, in use, together with a core member and the annular flange, it forms part of the magnetic circuit of the injector.

13 Claims, 3 Drawing Sheets

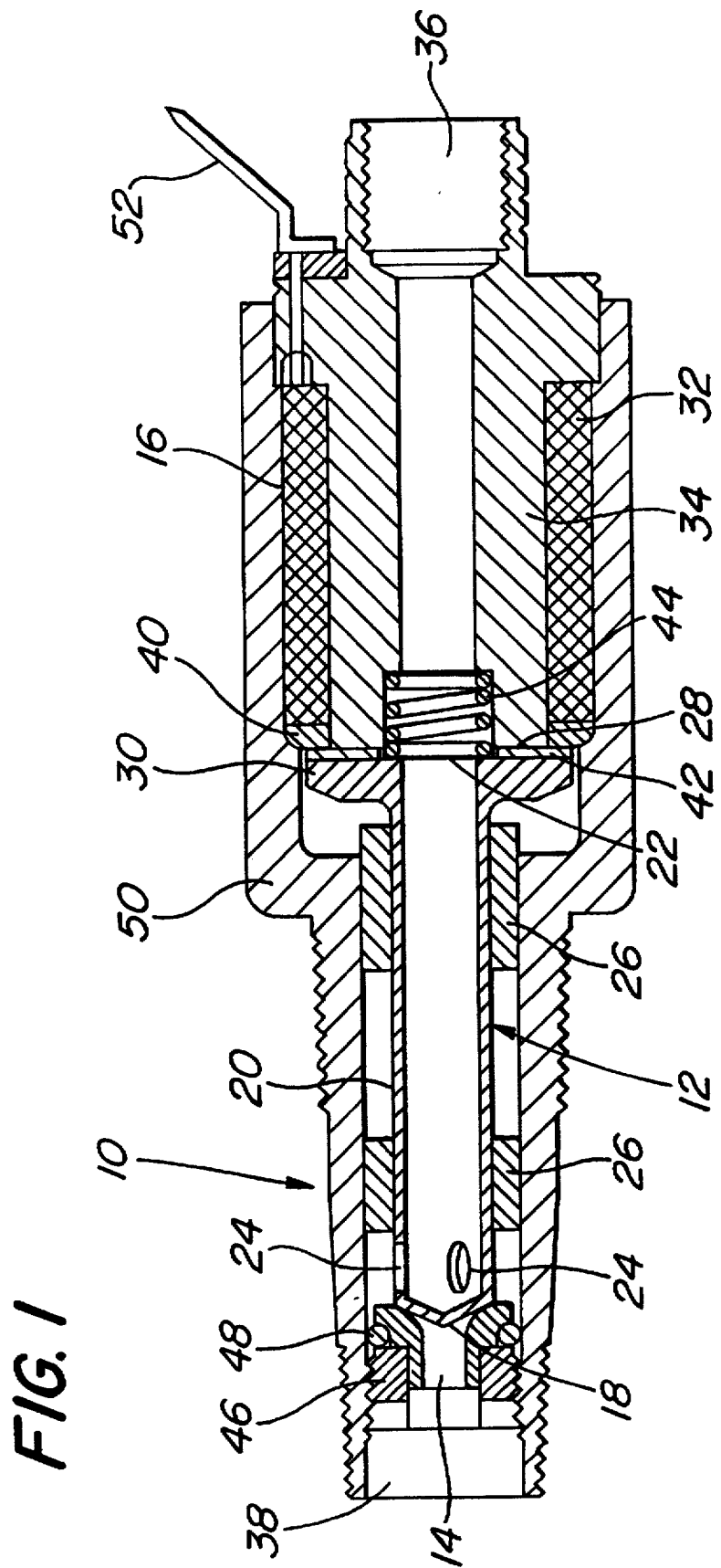

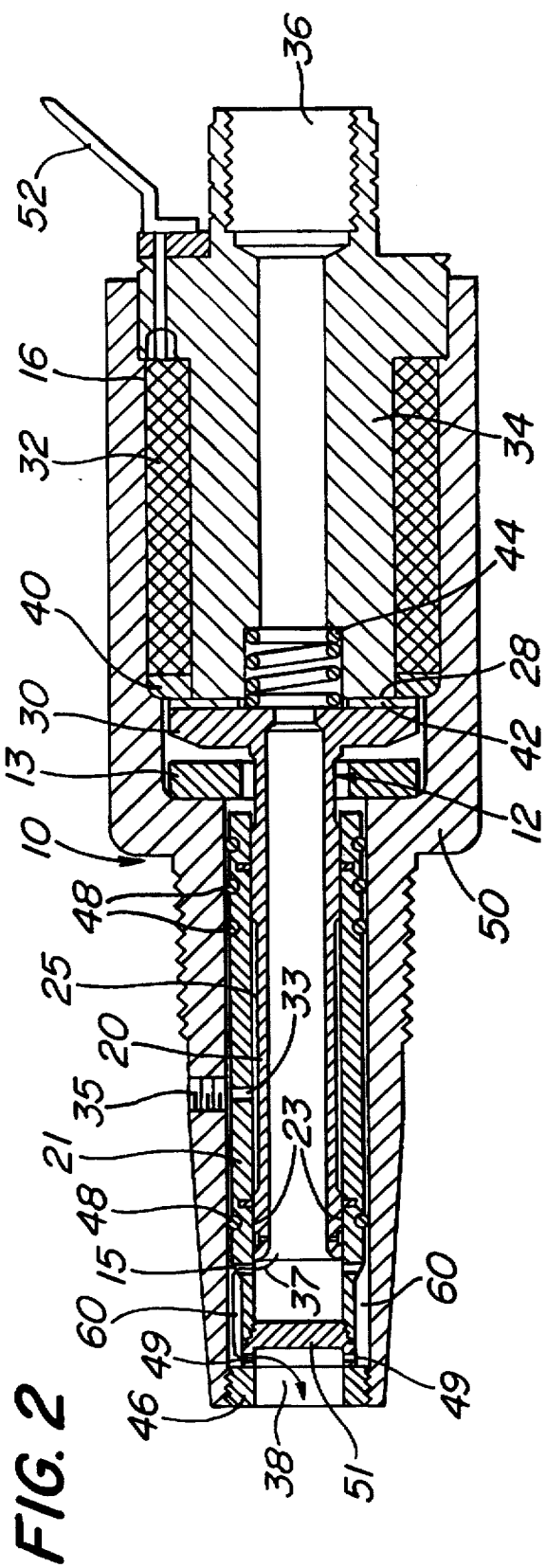
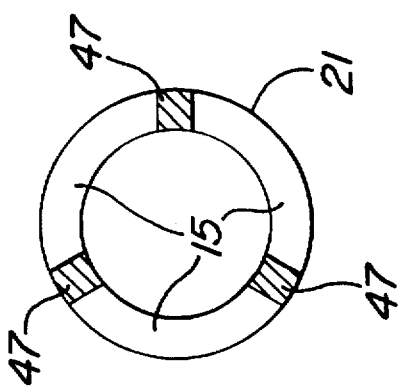
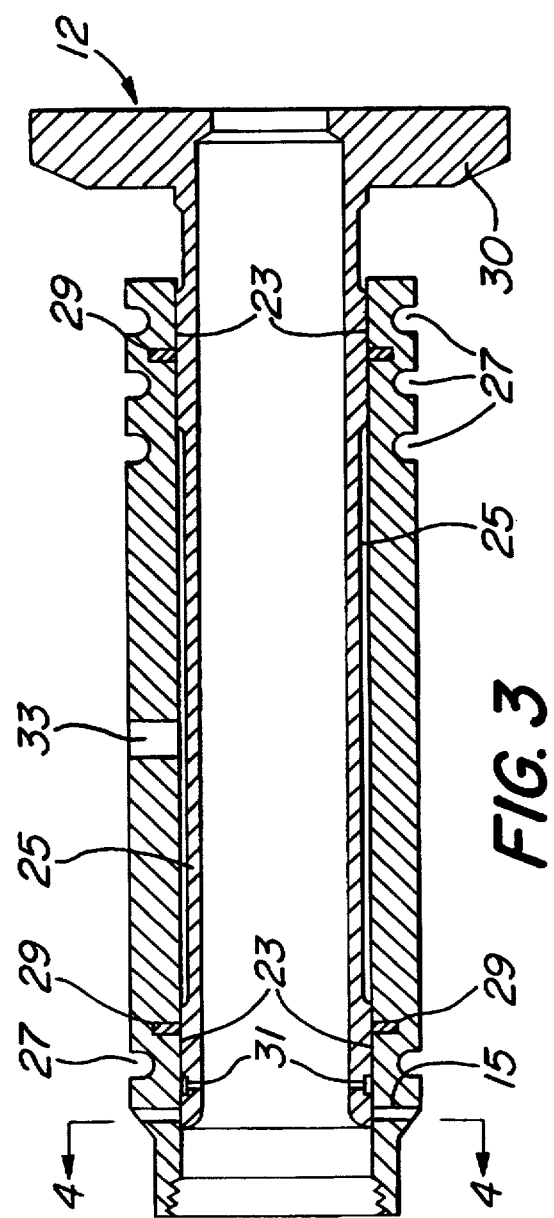

5,794,860

1

GAS INJECTOR FOR GAS FUELED INTERNAL COMBUSTION ENGINE

FIELD OF THE INVENTION

The present invention relates to a fluid injector for delivering a controlled quantity of pressurised fluid and relates particularly, though not exclusively, to a gas injector for delivering a controlled quantity of gaseous fuel to an internal combustion engine.

BACKGROUND TO THE INVENTION

The term "fluid" employed throughout this specification is used in the technical sense of any flowable substance, including a liquid or a gas, even though the description is given primarily with reference to the delivery of gas.

In co-pending International patent application No. PCT/AU92/00575 a Gas Delivery System is disclosed for delivering gaseous fuel to a gas fuelled internal combustion engine. A plurality of gas injectors are employed in the system, for injecting a controlled amount of gaseous fuel into a region adjacent the source of ignition in each cylinder of the engine. The Gas Delivery System is under the control of an engine control unit that directly controls operation of each injector responsive to various operating parameters of the engine, including engine speed and load. The engine control unit calculates an injector ON time for each injector in order to deliver a precisely controlled quantity of gaseous fuel to each cylinder of the engine to achieve optimum engine performance at the current speed and load.

The operating characteristics of prior art fluid injectors were found to be inadequate for the above gas delivery system. In particular, the opening and closing response times of prior art injectors were either found to be too slow or the flow rate capacity was too low for the purpose of delivering a precisely controlled and adequate quantity of gaseous fuel to each cylinder on demand.

Accordingly, the present invention was developed with a view to providing a fluid injector which overcomes at least some of the limitations of prior art injectors.

SUMMARY OF THE INVENTION

According to the present invention there is provided a fluid injector for delivering a controlled quantity of pressurised fluid, the injector comprising:

a valve member adapted to move from a first position, in which a port is closed to prevent flow of said fluid through the injector, to a second position in which said port is opened to permit a flow of said fluid through the injector, said valve member having a hollow elongate valve stem with an opening proximate both ends to allow a flow of said fluid through the valve stem;

a solenoid actuator for moving said valve member from said first position to said second position responsive to an electrical control signal whereby, in use, a precisely controlled quantity of said fluid can be delivered by the injector; and, wherein said valve member is slidably mounted in the injector with one end of the valve stem adjacent an end face of the solenoid actuator, said valve stem having a flange of magnetic material provided at said one end which faces the end face of the solenoid actuator and forms an armature of a magnetic circuit formed by the solenoid actuator.

Preferably said solenoid actuator comprises a coil wound about a stationary magnetic core member, said core member

2 having a hollow interior in fluid communication and coaxial with said hollow valve stem whereby, in use, fluid flowing through the injector can help dissipate heat generated by the coil.

Advantageously a non-magnetic separator is provided between an end face of the core member and said annular flange on the valve stem whereby, in use, any residual magnetic force acting on the valve member after said electrical control signal is switched off can be minimized.

Preferably an air gap provided between said annular flange and said end face of the core member is kept to a minimum and is designed to be substantially equal to the distance said valve member is required to be lifted from the valve seat to the second position, plus the thickness of said non-magnetic separator.

The injector preferably further comprises a return spring mounted between said solenoid actuator and valve member and adapted to bias said valve member towards said first position. In the preferred embodiment the injector is provided with an outer casing of magnetic material, a wall of the outer casing being located immediately adjacent said coil and, together with said core member and flange, forming part of the magnetic circuit of the solenoid actuator. Typically said core member and outer casing are both of substantially cylindrical configuration and said flange on the valve stem is of annular shape.

BRIEF DESCRIPTION OF THE DRAWINGS

In order to facilitate a more thorough understanding of the nature of the invention, a preferred embodiment of the fluid injector will now be described in detail, by way of example only, with reference to the accompanying drawings, in which:

FIG. 1 is a side elevation section view of a preferred embodiment of a fluid injector according to the invention;

FIG. 2 is a side elevation section view of a second embodiment of a fluid injector according to the invention;

FIG. 3 is an enlarged view of the valve part of the injector illustrated in FIG. 2;

FIG. 4 is a section view through the line A—A in FIG. 3; and

DETAILED DESCRIPTION OF PREFERRED EMBODIMENT

Figure 5A:
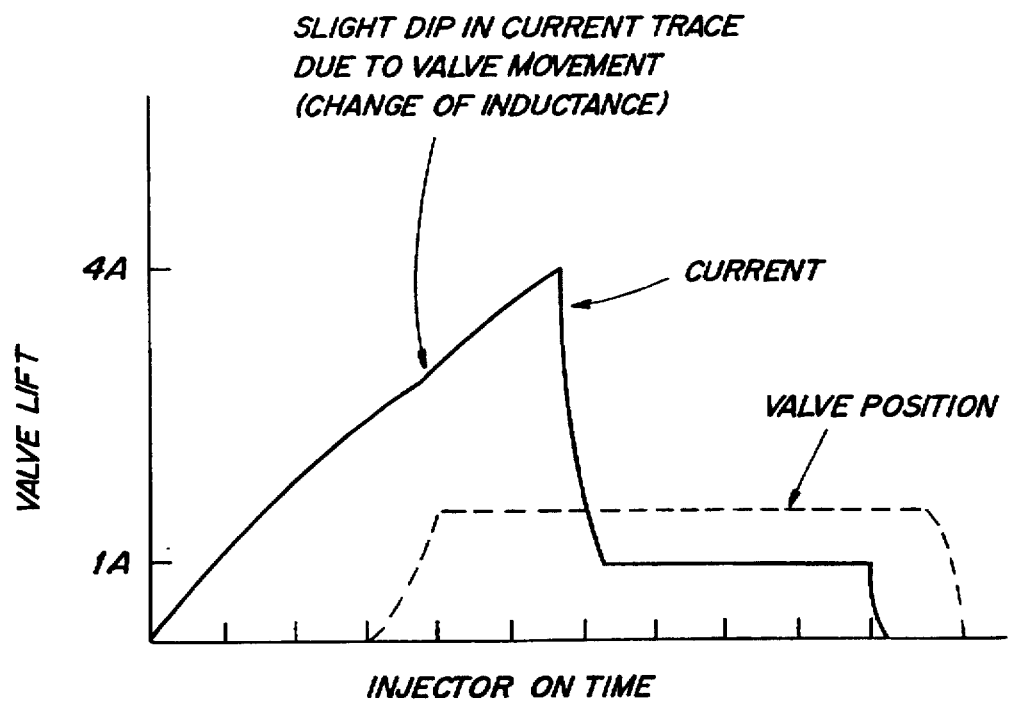
FIGS. 5(a) and (b) are typical electrical current verses time, and gas flow rate verses time curves respectively for the injector illustrated in FIG. 1.

Although the following description is given with reference to a gas injector, primarily intended for use in a gas delivery system for a gas fuelled internal combustion engine, it should be understood that the injector can be employed with minor modifications in many other applications for example, in the food processing industry for delivering a precisely controlled quantity of liquid food product.

A preferred embodiment of the fluid injector according to the invention, in the form of gas injector 10, is illustrated in FIG. 1. Gas injector 10 comprises a valve member 12 adapted to seat against a valve seat 14 in a first or closed position, (as illustrated) in which a flow of fluid through the injector is prevented, and being moveable to a second or open position in which the valve member 12 is lifted from the valve seat 14 to permit a flow of fluid through the injector 10. The injector 10 further comprises a solenoid actuator 16 for moving the valve member 12 from the first position to the second position responsive to an electrical control signal. In use, by modulating the electrical control signal a precisely controlled quantity of gas can be delivered by the gas injector 10 to the internal combustion engine.

Valve member 12 has a conical valve face 18 and a hollow elongate valve stem 20 having a first opening 22 at one end and a second opening in the form of three radial apertures 24 at the other end to allow a flow of gas through the valve member 12 in use. By forming the valve member 12 with a hollow valve stem 20 the mass of valve member 20 is also minimized. Low mass is desirable to give the injector 10 fast response times, and to reduce the impact force on valve seat 14. Valve member 12 is slidably mounted on bearings 26, with said one end of the valve stem adjacent an end face 28 of the solenoid actuator 16. The valve stem 20 is provided with an annular flange 30 at said one end, which faces the end face 28 of the solenoid actuator. Annular flange 30 is of magnetic material and forms the armature of the magnetic circuit formed by solenoid actuator 16.

A preferred construction of the valve member 12 utilizes a two part assembly where the valve stem 20 and conical valve face 18 constitute one part made from a hard wearing material such as a tool steel. The annular flange 30 constitutes the other part, which is connected to the valve stem 20 by means of a screw thread, and is typically made from a magnetically soft material. A further option is to make the valve stem 20 and conical valve face 18 also from different materials, so that the valve member 12 is of three part construction. Valve face 18 can then be replaced should it become worn, without having to replace the entire valve member 12.

Solenoid actuator 16 comprises a coil 32 wound about a stationary core member 34. Core member 34 has a hollow interior in fluid communication with the hollow valve stem 20. Therefore, gas supplied to the injector 10 via inlet 36 flows through the core member 34 and valve stem 20, before escaping via the second opening 24 through valve outlet 38, when the injector is in the ON condition, ie, when valve member 12 is lifted from valve seat 14 to the second position. To save space, the coil 32 is wound directly onto the core member 34, a former 40 being provided adjacent the end face 28 of the core member to give the winding of the coil 32 its correct shape. The core member 34 provides an excellent heat sink for heat generated by coil 32, since gas flows through the center of the core member 34.

A common phenomena with solenoids is that even when the current is switched off, residual magnetism can still hold the valve member firmly in its open position. In order to minimize this residual magnetic force, a thin non-magnetic separator (shim) 42 is provided between the end face 28 of the core member and the annular flange 30 of the valve member.

A return spring 44 is mounted between the solenoid actuator 16 and valve member 12, within the bore of the core member 34, and is adapted to bias the valve member 12 towards the first or closed position. Return spring 44 is designed to be as light as possible to ensure its natural frequency is much higher than the valve opening time, typically 1 ms (converted into frequency domain—typical period equals 2 ms, approximately equal to 500 Hz worst case, to 250 Hz). The natural frequency of the return spring 44 is, for example, 9.8 kHz which is approximately twenty times the valve opening frequency, and therefore should not result in resonant destruction of the return spring.

Valve seat 14 is supported on an externally accessed adjuster 46, which can be used to adjust the extent of lift of valve member 12 and hence the fluid flow in the open position or ON condition of the injector 10. A small radial gap between the bore of the adjuster 46 and the valve seat 14 gives the valve seat a self-centering ability with respect to the valve face 18, which facilitates faster lapping of the valve face and seat. An O-ring 48 of resilient material provides a seal between the valve seat 14, adjuster 46 and an outer casing 50 of the injector.

Outer casing 50 of the injector is manufactured of magnetic material, and a wall of the outer casing is located immediately adjacent coil 32 so that, in use, together with the core member 34 and annular flange 30, it forms part of the magnetic circuit of the injector. In this embodiment, both the core member 34 and outer casing 50 are of substantially cylindrical configuration. To minimize flux leakage between the end face 28 of the core member 34 and outer casing 50, the diameter of annular flange 30 is designed so that the radial distance between the outer circumferential surface of core member 34 and the inner circumferential surface of outer casing 50 is approximately equal to 2.5 times the valve lift and separator thickness. The void between the core body 34 and outer casing 50 is the location of coil 32, which when energized pushes the collective magnetic field from each turn of the coil into a single magnetic flux path in the core body 34, annular flange 30, outer casing 50 and the air gaps. The profile of annular flange 30 of valve member 12 is tapered to reflect the same magnetic flow path area once the outer diameter of core member 34 is exceeded. This also helps to minimize the mass of the valve member 12.

In order to reduce the total air gap, the majority of the distance between annular flange 30 and the end face 28 of core member 34 is devoted to that required to cater for valve lift, i.e., the lift required to obtain the desired fluid flow rate. The remainder of the total air gap is that required for the separator 42 and the radial gap between the outer circumference of annular flange 30 and the inner circumference of outer casing 50. Minimizing the total air gap directly minimizes the Ampere-turn requirement for coil 32, which is highly desirable, especially as the injector/solenoid actuator increases in size, since scale effects detract from the performance of the injector.

In the injector of FIG. 1, the valve seat and valve face are subject to high wear due to repeated impact of the two components, typically more than $1000 \times 10^6$ cycles over the life of the injector. In a second embodiment of the injector, illustrated in FIGS. 2, 3 and 4, the valve part of the injector has been redesigned to eliminate the repeated impact between the valve seat and valve face. Parts which have the same or similar function in the second embodiment have been given the same reference numerals as in the embodiment of FIG. 1.

Gas injector 10 of FIGS. 2 and 3 comprises a valve member 12 adapted to slide from a first position, in which a port 15 is closed to prevent a flow of fluid through the injector to a second position (as illustrated) in which the port 15 is opened to permit a flow of fluid, as indicated by the arrow 37, through the injector 10. The flow 37 is through the ports 15, a chamber 60 and through exit holes 49 and then to the outlet 38. A valve stop 13 in the form of an annular member of non-magnetic, preferably metallic material, is provided to limit the travel of the valve member 12.

Valve member 12 in the embodiment of FIGS. 2 and 3 also comprises a hollow elongated valve stem 20 which is open at both ends to allow a flow of gas through the valve member 12 in use. By forming the valve member 12 with a hollow valve stem 20 the mass of valve member 12 is minimized. Low mass is desirable to give the injector 10 fast response times, and to reduce the impact force on valve stop 13. Valve stem 20 is slidably received in a sleeve member 21, and port 15 is formed in a side wall of the sleeve member 21 as can be seen most clearly in FIGS. 2 and 3. The valve stem 20 is provided with two sliding surfaces 23, which are radially lapped with the internal surface of sleeve member 21 to give an extremely close fit. Sliding friction between the valve stem 20 and sleeve member 21 is minimized by providing a lubricant space 25 between the two components over most of the length of the valve stem 20. Sleeve member 21 is provided with a plurality of circumferential grooves 27 in which resilient O-rings are received as illustrated in FIG. 2 to support the sleeve member 21 within outer casing 50 of the injector. The O-rings minimize distortion of sleeve member 21 due to external forces on the outer casing 50.

Seals 29 are provided in sleeve member 21 opposite sliding surfaces 23 for containing a lubricant within space 25. A groove and holes 31 are provided in valve stem 20, adjacent port 15 in sleeve member 21, to reduce the differential pressure across one of the seals 29. One or more lubricant access holes 33 are provided in sleeve member 21 and a lubricant fill point 35 is provided in the outer casing 50 for lubricant service requirements.

Sleeve member 21 is supported on an externally accessed adjuster 46, at a position in which the end of the valve stem 20 overlaps the port 15 in the first or closed position. A front portion 51 of the adjustor 46 blocks passage of the flow 37 directly to the outlet 38. Maximum fluid flow area through port 15 can be obtained by forming three radial slots in the wall of sleeve member 21, as can be seen most clearly in FIG. 3. The radial slots of port 15 are machined using a circular cutter which cuts through the wall of sleeve member 22 in a radial direction, leaving only small bridging pieces 47. In the illustrated embodiment, the radial slots 15 are axially aligned in the wall of sleeve member 22. However, if desired each slot can be axially offset with respect to its neighbor so that the area of the radial flow path can be varied in three increments depending on the lift of valve member 12. The lift of valve member 12 is set by the distance between the annular flange 30 in the open position and the stop 18. The flow area can be the same for identical injectors if the valve stem 20 completely uncovers the slots 15, ie., valve lift is greater than port width and overlap (in closed position).

In other respects the injector of FIGS. 2 to 4 is substantially identical to that of FIG. 1, and will not be described again here. The remainder of the description that follows is applicable to both embodiments of the injector.

It is necessary to perform a number of iterations in the design process of the injector 10, to size the core area, number of turns of the coil and return spring stiffness. Fast opening times are desirable to minimize variations between supposedly identical injectors and to ensure that gas is delivered to each cylinder on demand. Furthermore, injector opening times must be short compared with the maximum total ON time to prevent the same injector overlapping itself at high engine speeds. The injector design process starts with the required orifice size, which is itself dependent on the speed at which the engine develops maximum power and the quantity of gas to be delivered. A steady state flow can be ascertained by dividing the required gas quantity by the available time for induction, which is approximately equal to the time taken to complete 0.6 revolutions of the engine.

The orifice is designed to operate in the sonic flow regime such that variations in expected back pressure do not alter the gas flow. Also, the gas inlet pressure and the valve seating diameter are set to values which will require a valve lift in the order of 1 mm. The annular gap between the conical valve face 18 and the valve seat 14 is designed to have the same area as the orifice through valve seat 14, when the valve member 12 is in its lifted position. Gas pressure is typically 700 to 800 kPa. Maximum allowable back pressure is 0.544 times absolute gas pressure (0.544 depends on gas composition, however this number is valid for natural gas as derived from thermodynamic theory). Once the orifice size is established, the seat diameter and area known, and gas pressure and minimum back pressure set, it is possible to calculate the gas pressure force holding the valve shut and which must be overcome to open the valve.

To help open the injectors quickly while minimizing electrical heating of the coil a special driving circuit (not illustrated) is employed, which applies full potential difference (24 Volts) to the coil 32, lets the current peak at 4 Amps then controls the current to 1 Amp until it is switched off. Obviously these current values may be varied for different sized injectors. The current will rise in accordance with the applied voltage, coil resistance and injector inductance. Injector inductance is proportional to (number of turns)$^2$ and magnetic path area divided by air gap and coil resistance. All the variables are manipulated into a simulation program and fixed at trial values. The program is run, and if sufficient force is generated for enough time it will lift the valve member 12 until annular flange 30 contacts the core member 34 (separator 42). By varying the number of turns the current is set to reach 4 Amps just after the valve is fully open (worst case scenario).

Figure 5B:
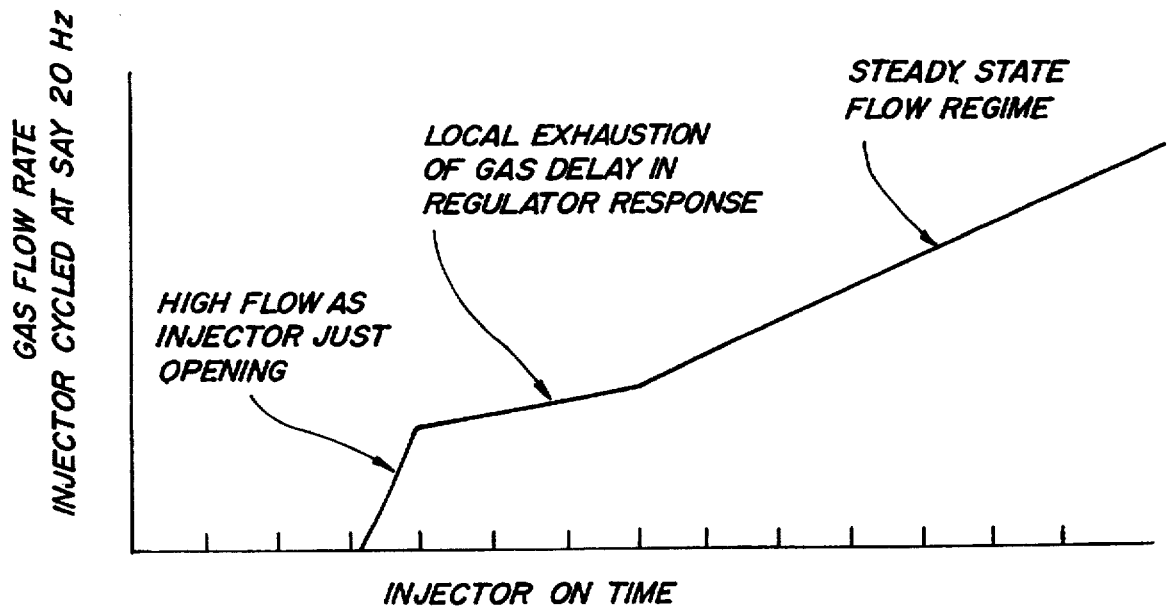

FIG. 5(a) illustrates the variation in current produced in coil 32 by the driving circuit. The driving circuit generates an electrical control signal to energize the coil, and which is adapted to produced a control current that rises rapidly to a maximum value (4 Amps) to effect rapid movement of the valve member to its open position. The electrical control signal is applied to coil 32 via electrical contact 52. As can be seen in FIG. 5(a) there is a slight dip in the current trace due to a change in inductance of the magnetic circuit as annular flange 30 moves towards the end face 28 of core member 34 and closes the air gap therebetween. Once the valve member 12 is in its open position, the control current rapidly falls to a minimum value (1 Amp) required to hold the valve member in its open position. The control current is maintained at the minimum value for a predetermined time interval calculated to achieve the required injector ON time so that a precisely controlled quantity of gas can be delivered to the corresponding cylinder. FIG. 5(b) illustrates the variation in gas flow rate as the valve member 12 moves from the first position to the second (open) position. Initially there is a high flow of gas as the valve face lifts from the seat 14, followed by a short period of reduced flow due to the exhaustion of gas within the injector casing and supply line, as well as a short delay in the regulator response. This is followed by a steady state flow regime in which gas passes through the injector at a constant rate until the control current is switched off.

Now that preferred embodiments of the fluid injector according to the invention have been described in detail, it will be apparent that the gas injector described has significant advantages over comparable prior art injectors. In particular, through careful design of the mechanical structure and magnetic circuit of the injector, minimum response times can be achieved to obtain precisely controlled quantities of injected fluid from (supposedly) identical injectors, ie., minimize variance due to manufacturing tolerances.

I claim:

1. A gas injector for delivering a controlled quantity of pressurized gas, the injector comprising:

a valve member adapted to move from a first position, in which a port is closed to prevent flow of said gas through the injector, to a second position in which said port is opened to permit a flow of said gas through the injector, said valve member having a hollow elongate valve stem with an opening proximate both ends to allow a flow of said gas through the valve stem;

a solenoid actuator for moving said valve member from said first position to said second position responsive to an electrical control signal wherein said solenoid actuator comprises a coil wound about a stationary, substantially cylindrical magnetic core member, said core member having a hollow interior in fluid communication and coaxial with said hollow valve stem whereby, in use, gas flowing through the injector can help dissipate heat generated by the coil;

wherein said valve member is slidably mounted in the injector with one end of the valve stem adjacent an end face of the solenoid actuator, said valve stem having an annular flange of magnetic material provided at said one end which faces the end face of the solenoid actuator and forms an armature of a magnetic circuit formed by the solenoid actuator;

wherein the injector is provided with a substantially cylindrical outer casing of magnetic material, a wall of the outer casing being located immediately adjacent said coil and, together with said core member and flange, forming part of the magnetic circuit of the solenoid actuator; and wherein a nonmagnetic separator is provided between an end face of the core member and said annular flange on the valve stem whereby, in use, any residual magnetic force acting on the valve member after said electrical control signal is switched off can be minimized.

2. A gas injector as claimed in claim 1, wherein said core member and outer casing are both of substantially cylindrical configuration and said flange on the valve stem is of annular shape.

3. A gas injector as claimed in claim 1, wherein an air gap provided between said annular flange and said end face of the core member is kept to a minimum and is designed to be substantially equal to the distance said valve member is required to be moved to the second position, plus the thickness of said non-magnetic separator.

4. A gas injector as claimed in claim 3, wherein the diameter of said annular flange is designed so that the radial distance between an outer circumferential surface of the core member and an inner circumferential surface of the outer casing is substantially greater than said air gap whereby, in use, flux leakage between the end face of the core member and the outer casing can be minimized.

5. A gas injector as claimed in claim 4, wherein the coil of the solenoid actuator when energized pushes the collective magnetic field from each turn of the coil into a single magnetic flux path in the core body, the annular flange, the outer casing and the air gap and wherein the profile of the annular flange is tapered to provide a substantially constant magnetic flow path area outside the core member.

6. A gas injector as claimed in claim 5, further comprising a return spring mounted between said solenoid actuator and valve member and adapted to bias said valve member towards said first position, and wherein the natural frequency of the return spring is selected to be significantly higher than a typical frequency of operation of the injector whereby, in use, resonant destruction of the return spring is avoided.

7. A gas injector for delivering a controlled quantity of pressurized gas, the injector comprising:

a valve member adapted to move from a first position, in which a port is closed to prevent flow of said gas through the injector, to a second position in which said port is opened to permit a flow of said gas through the injector, said valve member having a hollow elongate valve stem with an opening proximate both ends to allow a flow of said gas through the valve stem;

said valve member being slidably received in a sleeve member and said port being provided in a side wall of said sleeve member whereby, in use, a flow of gas can pass through the valve stem and radially outwardly through said port when the valve member is in the second positions;

a solenoid actuator for moving said valve member from said first position to said second position responsive to an electrical control signal wherein said solenoid actuator comprises a coil wound about a stationary magnetic core member, said core member having a hollow interior in fluid communication and coaxial with said hollow valve stem whereby, in use, gas flowing through the injector can help dissipate heat generated by the coil;

wherein said valve member is slidably mounted in the injector with one end of the valve stem adjacent an end face of the solenoid actuator, said valve stem having a flange of magnetic material provided at said one end which faces the end face of the solenoid actuator and forms an armature of a magnetic circuit formed by the solenoid actuator; and wherein the injector is provided with an outer casing of magnetic material, a wall of the outer casing being located immediately adjacent said coil and, together with said core member and flange, forming part of the magnetic circuit of the solenoid actuator.

8. A gas injector as claimed in claim 7, wherein said valve stem is provided with first and second sliding surfaces which are radially lapped with an internal surface of the sleeve member to give a close tolerance fit.

9. A gas injector as claimed in claim 8, wherein said port is formed by a plurality of radial slots in the wall of the sleeve member.

10. A gas injector as claimed in claim 9, wherein the sleeve member is provided with a plurality of circumferential grooves 27 in which resilient O-rings are received to support the sleeve member within an outer casing of the injector whereby, in use, the O-rings help to minimize distortion of the sleeve member due to external forces on the outer casing of the injector.

11. A gas injector for delivering a controlled quantity of pressurized gas, the injector comprising:

a valve member adapted to move from a first position, in which a port is closed to prevent flow of said gas through the injector, to a second position in which said port is opened to permit a flow of said gas through the injector, said valve member having a hollow elongate valve stem with an opening proximate both ends to allow a flow of said gas through the valve stem;

an externally accessed adjustor for adjusting the gas flow through said port when the valve member is in the second position;

a solenoid actuator for moving said valve member from said first position to said second position responsive to an electrical control signal wherein said solenoid actuator comprises a coil wound about a stationary magnetic core member, said core member having a hollow interior in fluid communication and coaxial with said hollow valve stem whereby in use, gas flowing through the injector can help dissipate heat generated by the coil;

wherein said valve member is slidably mounted in the injector with one end of the valve stem adjacent an end face of the solenoid actuator, said valve stem having a flange of magnetic material provided at said one end which faces the end face of the solenoid actuator and forms an armature of a magnetic circuit formed by the solenoid actuator; and wherein the injector is provided with an outer casing of magnetic material, a wall of the outer casing being located immediately adjacent said coil and, together with said core member and flange, forming part of the magnetic circuit of the solenoid actuator.

12. A gas injector as claimed in claim 11, wherein the valve stem has a valve face adapted to seat against a valve seat in said first position, said valve seat being supported on said externally accessed adjustor which can be used to adjust the position of the valve seat and hence the extent of lift of the valve member from the valve seat.

13. A gas injector for delivering a controlled quantity of pressurized gas, the injector comprising:

a valve member adapted to move from a first position, in which a port is closed to prevent flow of said gas through the injector, to a second position in which said port is opened to permit a flow of said gas through the injector, said valve member having a hollow elongate valve stem with an opening proximate both ends to allow a flow of said gas fluid through the valve stem;

an externally accessed adjustor for adjusting the gas flow through said port when the valve member is in the second position;

a solenoid actuator for moving said valve member from said first position to said second position responsive to an electrical control signal whereby, in use, a precisely controlled quantity of said gas can be delivered by the injector;

wherein said valve member is slidably mounted in the injector with one end of the valve stem adjacent an end face of the solenoid actuator, said valve stem having a flange of magnetic material provided at said one end which faces the end face of the solenoid actuator and forms an armature of a magnetic circuit formed by the solenoid actuator;

wherein the valve stem has a valve face adapted to seat against a valve seat in said first position, said valve seat being supported on said externally accessed adjustor which can be used to adjust the position of the valve seat and hence the extent of lift of the valve member from the valve seat; and wherein said adjustor has a center bore in which said valve seat is supported, and wherein a small radial gap is provided between the bore of the adjustor and the valve seat to give the valve seat a self-centering ability with respect to the valve face.

* * * * *